Aug. 13, 1968          G. V. GRISPO          3,396,598
MICROPOSITIONER
Filed Aug. 26, 1964          2 Sheets-Sheet 2
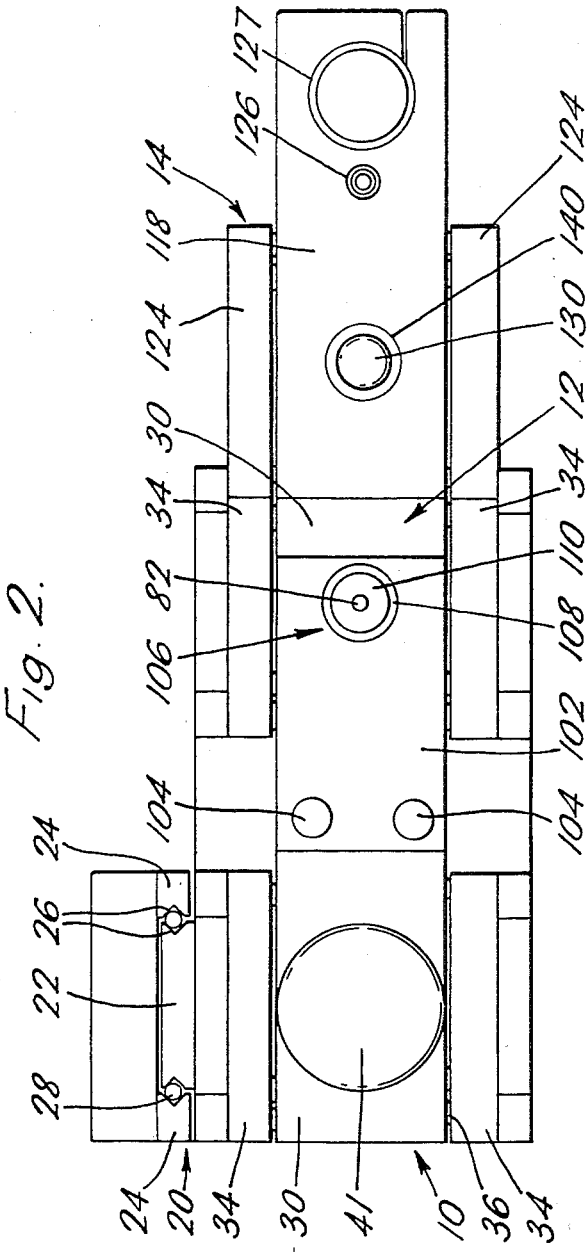
INVENTOR
GEORGE VINCENT GRISPO
BY
Finkelstein, Finkelstein & Plueger
ATTORNEYS ID # United States Patent Office 3,396,598
Patented Aug. 13, 1968

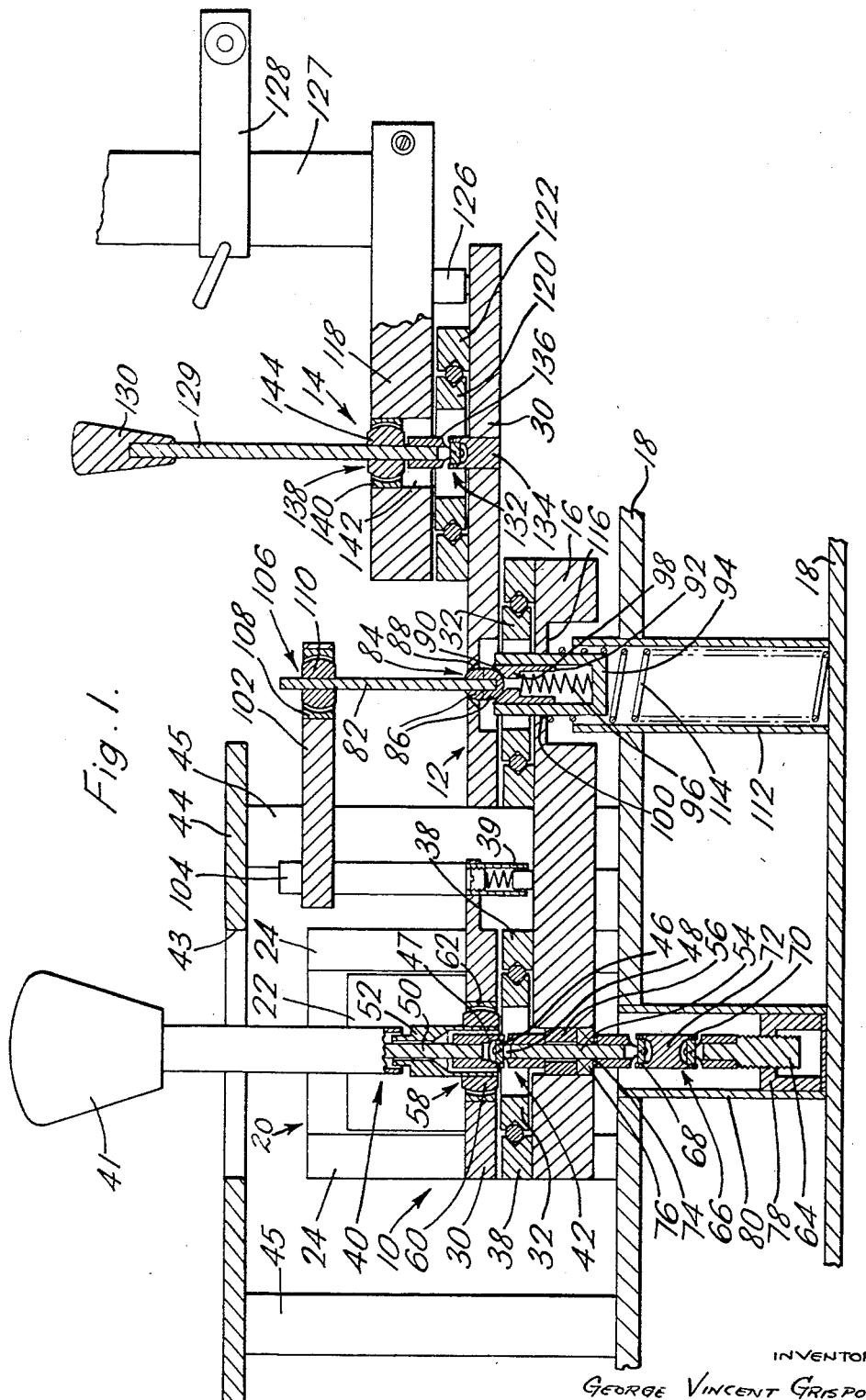

3,396,598
MICROPOSITIONER
George Vincent Grispo, 6a Ormesby Gardens,
Greenford, Middlesex, England
Filed Aug. 26, 1964, Ser. No. 392,156
Claims priority, application Great Britain, Sept. 23, 1963,
37,271/63
16 Claims. (Cl. 74—479)

This invention relates to micropositioners.

The invention is concerned in particular with micropositioners of the kind adapted to translate movements executed by a control member into related movements on a reduced scale executed by a workpiece holder; such related movements may be in the same direction as the movements of the control member, or may be reversed in direction with respect to the movements of the control member. An example of a micropositioner of the kind specified is a microscope manipulator, the workpiece holder of which is arranged to execute very small movements in response to relatively large movements of a manually operable control lever. The workpiece holder of a microscope manipulator may carry, for example, a dissecting tool, or may carry an electrical proble or any other tool which is required to execute very small movements.

It is an object of the present invention to provide a new and improved micropositioner of the kind specified.

Micropositioners in accordance with the invention make use of linear slides. In this specification, by a linear slide is meant a mechanical device comprising first and second members which are movable relative to each other, the first member being arranged to be movable, without rotation, substantially in a single plane relative to the second member. For the sake of clarity, in this specification the first member of a linear slide will be referred to as the movable member and the second member will be referred to as the base member.

According to one aspect of the invention, a micropositioner includes at least two linear slides, the base members of which are fixed relative to each other; a control lever which is arranged to be pivotable about a first pivot point substantially fixed relative to the base member of a first one of the linear slides, a first portion of the control lever being arranged to cooperate with the movable member of the first linear slide in such a manner that movement of a second portion of the control lever more remote from said first pivot point than is said first portion of the control lever brings about related movement on a reduced scale of the movable member of the first linear slide; a second lever which is arranged to be pivotable about a second pivot point substantially fixed relative to the base member of a second one of the linear slides, a first portion of said second lever being arranged to cooperate with the movable member of the second linear slide in such a manner that movement of a second portion of said second lever more remote from said second pivot point than is said first portion of said second lever brings about related movement on a reduced scale of the movable member of the second linear slide; and connecting means for connecting said second portion of said second lever to the movable member of the first linear slide for movement therewith.

It should be understood that a micropositioner in accordance with the present invention could include three or more linear slides arranged in sequence, the movable member of the third linear slide being linked with the movable member of the second linear slide in a similar manner to that in which the movable member of the second linear slide is linked with the movable member of the first linear slide, and so on.

According to a further aspect of the invention, in a micropositioner in accordance with the last but one of the preceding paragraphs, each lever is mounted for universal movement about the relevant pivot point.

According to another aspect of the invention, a micropositioner includes a linear slide mounted on a support; and a control lever which is mounted for universal movement about a pivot point substantially fixed relative to the base member of the linear slide, a first portion of the control lever being arranged to cooperate with said movable member in such a manner that movement of a second portion of the control lever more remote from said pivot point than is said first portion brings about related movement on a reduced scale of said movable member, the control lever being rotatable about its axis and being operatively connected with said movable member and said support so that rotation of the control lever brings about movement of the base member of the linear slide relative to said support in a direction perpendicular to said plane.

One arrangement in accordance with the invention will now be described by way of an example with reference to the accompanying drawings, in which:

FIGURE 1 is a central, part-sectional, side elevation of a microscope manipulator; and FIGURE 2 is a plan view of the microscope manipulator shown in FIGURE 1 with the hand rest and workpiece holder removed.

Referring to the drawings, the microscope manipulator includes two main linear slides 10 and 12 and an auxiliary linear slide 14.

The manipulator includes a horizontal rectangular baseplate 16 which serves as the base member for each of the main linear slides 10 and 12, and a support structure 18 to which the baseplate 16 is attached by means of a vertical slide 20.

The vertical slide 20, which allows for vertical adjustment of the baseplate 16 relative to the support structure 18 consists of a vertically extending bar 22 of generally rectangular cross-section which is fixed to the baseplate 16. The bar 22 is slidably mounted between two vertically extending side bars 24 which are secured to the support structure 18, the vertical narrow faces of the bar 22 being respectively in sliding relationship with adjacent faces of the side bars 24. Two longitudinal grooves 26 of V-shaped cross-section are formed in each of the cooperating faces of the bar 22 and side bars 24, and balls 28 are inserted between each pair of cooperating grooves 26 to permit low-friction relative movement between the bar 22 and side bars 24.

Each of the main linear slides 10 and 12 includes two horizontal rectangular movable plates 30 and 32 arranged one above the other with their long dimensions at right angles to each other, the upper movable plate 30 of each linear slide 10 or 12 serving as the movable member of the slide 10 or 12. Two elongated bars 34 (see FIGURE 2) of generally rectangular cross-section are secured to the upper face of the lower movable plate 32 of each slide 10 or 12 and are respectively arranged adjacent to the long sides of the relevant plate 30, the lower face of the plate 30 being slightly higher than the lower faces of the side bars 34. The long sides of each plate 30 have longitudinal grooves (not seen) of V-shaped section machined in them, as do the inner faces of the side bars 34. Balls 36 are inserted in each corresponding pair of grooves of the plates 30 and side bars 34 to allow low-friction relative movement between each plate 30 and the relevant side bars 34. Backlash may be eliminated by tight initial assembly and the use of a low-friction lubricant (such as molybdenum disulphide).

The lower movable plate 32 of each slide 10 or 12 is in turn mounted for slidable movement between two further bars 38 of generally rectangular cross-section which are respectively arranged adjacent to the long sides of the plate 32 and which are secured to the upper surface of the baseplate 16. Thus, it will be appreciated that each plate 30 is movable in any direction in a plane parallel to the main faces of the baseplate 16. The upper end of a vertically extending spring loaded member 39 is secured to the plate 30 of the linear slide 10, the lower end of the member 39 bearing resiliently against, and being adapted to slide over, the upper surface of the baseplate 16. The purpose of the member 39 is to provide a certain amount of friction between the relevant plate 30 and the baseplate 16.

The micropositioner has a control lever 40 which extends upwards from the baseplate 16 and the upper portion of which is formed as a control knob 41, the lever 40 being pivotably mounted on the baseplate 16 by means of a universal joint 42; the actual pivot point of the lever 40 is the centre of the joint 42. The lever 40 passes through an aperture 43 in a handrest 44 which is secured to the base 16 by means of posts 45. The universal joint 42 consists essentially of a central member 46 having two pairs of parallel flat surfaces, each pair of flat surfaces being at right angles to the other pair, and upper and lower forked members 47 and 48 which respectively embrace the two pairs of flat surfaces, the members 47 and 48 being each pivotable about an axis perpendicular to the relevant pair of flat surfaces.

The stem 50 of the upper forked member 46 is mounted in a sleeve bearing 52 which forms part of the lever 40, and the stem 54 of the lower forked member 48 is mounted in a bush bearing 56, each of the stems 50 and 54 being rotatable about its axis.

The lower portion of the lever 40 passes through the plate 30 of the linear slide 10, and the lever 40 cooperates with this plate 30 in such a manner that movement of the control knob 41 brings about corresponding movement on a reduced scale of this plate 30.

Cooperation between the lever 40 and the plate 30 of the linear slide 10 is achieved by using a spherical bearing 58. The bearing 58 consists of an inner annular member 60, having a circular cylindrical bore and a convex outer surface, mounted in and retained by an outer annular member 62 having a concave inner face which surrounds, and is in mating contact with, the convex surface of the member 60. The outer annular member 62 is secured in an aperture in the plate 30, while the sleeve bearing 52 is secured in the bore of the inner annular member 60, the arrangement being such that the lever 40 can pivot in any sense relative to the plate 30 about the centre of the member 60.

The lower stem 54 of the universal joint 42 is connected to an externally threaded member 64 by means of a double universal joint 66. The double universal joint 66 is in effect formed by two single universal joints 68 and 70, each similar to the joint 42, arranged one above the other, the stem of the lower forked member of the joint 68 being integral with the stem of the upper forked member of the joint 70 to form a common central member 72. The stem of the upper forked member of the joint 68 is integral with the stem 54 of the joint 42, while the stem of the lower forked member of the joint 70 is secured to the threaded member 64. The stem 54 is provided with a circumferential shoulder 74, and a thrust bearing 76 is interposed between the shoulder 74 and the lower end of the bush bearing 56.

The threaded member 64 engages in a mating internally threaded member 78 secured inside a vertically extending hollow post 80 which forms part of the support structure 18. It will be appreciated that rotational movement of the lever 40 about its axis will be transmitted to the threaded member 64, thereby bringing about upward or downward movement of the assembly of the lever 40 and universal joints 42 and 66 dependent on the sense of rotation of the lever 40; such movement of this assembly will be transmitted to the baseplate 16 via the thrust bearing 76, the bar 22 of the vertical slide 20 sliding between the side bars 24. It should be understood that the purpose of the double universal joint 66 is to allow for any misregistration between the axes of the stem 54 and the member 64.

The microscope manipulator also includes a second lever 82 which extends upwards from the plate 30 of the liear slide 12. The lower end of the lever 82 is secured to a swivel member 84 which is made up of two part spherical members 86 arranged one above the other. The members 86 are each slightly greater than a hemisphere so that the centers of curvature of the members 86 are spaced a short distance apart in a vertical direction. The swivel member 84 is accommodated in a recess in the plate 30 of the linear slide 12, the surface of the upper member 86 being in contact with a frusto-conical surface 88 which forms part of the bounding surface of this recess. The lower member 86 is supported in a frusto-conical recess 90 formed in the upper part of a vertically extending, circular cylindrical slide member 92. The slide member 92 is a sliding fit in a cup 94, and a vertically extending compression spring 96 is interposed between the base of the cup 94 and the slide member 92, the upper end of the spring 96 being housed in a recess 98 formed in the lower part of the slide member 92; the cup 94 is secured in an aperture 100 formed in the baseplate 16. It will be appreciated that the spring 96 causes the swivel member 84 to be resiliently gripped between the relevant plate 30 and the slide member 92. Movement of the upper part of the lever 82 will bring about corresponding movement on a reduced scale of the plate 30 of the linear slide 12, the lever 82 pivoting about the centre of curvature of the lower member 86, and the members 86 each sliding in contact with the relevant conical surface. It will be appreciated that pivotal movement of the lever 82 away from its mean vertical position will cause the slide member 92 to move upwardly under the pressure exerted by the spring 96.

The upper portion of the lever 82 is connected for movement with the plate 30 of the linear slide 10 by means of a connecting plate 102 which is connected to two posts 104 secured to, and extending upwardly from, the upper surface of this plate 30. The connecting plate 102 is slidably connected to the two posts 104 and to the lever 82 in such a manner that the plate 102 may be set at any distance from the baseplate 16 by virtue of a stiff sliding motion of the plate 102 in a vertical sense along the posts 104 and the lever 82; it should be understood that in normal operation of the microscope manipulator the plate 102 does not move relative to the posts 104 and the lever 82. Cooperation between the plate 102 and the lever 82 is obtained by means of a spherical bearing 106 which is generally similar to the bearing 58, the bearing 106 comprising an outer annular member 108 secured to the plate 102 and an inner annular member 110 through which passes the lever 82. It will be appreciated that the overall scale of reduction afforded by the manipulator may be varied by adjusting the position of the plate 102 relative to the baseplate 16 in a vertical sense.

The lower end of the cup 94 is accommodated in the upper portion of a vertically extending hollow post 112 which forms part of the support structure 18. A compression spring 114 is housed in the post 112, the upper portion of the spring 114 surrounding the lower portion of the cup 94, and the upper end of the spring bearing against a shoulder 116 which forms part of the baseplate 16. The purpose of the spring 114 is to support part of the weight of the assembly of the baseplate 16 and linear slides 10 and 12.

Coarse adjustment is obtained by means of the auxiliary linear slide 14 which is similar to each of the linear slides 10 and 12. The baseplate of the linear slide 14 is formed by the plate 30 of the linear slide 12, and the upper and lower movable plates of the slide 14 are respectively formed by plates 118 and 120. The plate 120 is slidable between two side bars 122 which are secured to the upper face of the plate 30 of the slide 12, while the plate 118 is slidable between two side bars 124 which are secured to the upper face of the plate 120. The upper movable plate 118 of the slide 14 is movable, without rotation, in any direction substantially in a plane parallel to the upper face of the plate 30 of the linear slide 12. The plate 118 has secured to it a spring loaded member 126 which is similar to the member 39, the lower end of the member 126 bearing resiliently against, and being slidable over, the upper face of the plate 30 of the slide 12; the purpose of the member 126 is to provide a certain amount of friction between the plate 118 and the relevant plate 30.

The plate 118 is provided with an upwardly extending post 127 to which is attached a workpiece holder 128. The holder 128 is adapted to hold a workpiece (not shown) which it is desired to view and manipulate under a microscope (not shown).

The auxiliary slide 14 is associated with a lever 129 which extends upwards from the plate 30 of the slide 12 and which forms a coarse adjustment control lever for the microscope manipulator, the upper end of the lever 129 being formed as a control knob 130. The lower end of the lever 129 is pivotably secured to the relevant plate 30 by means of a universal joint 132 which is similar to the universal joint 42, the actual pivot point of the lever 129 being the centre of the joint 132; the lower forked member 134 of the universal joint 132 is secured to the relevant plate 30, while the upper forked member 136 is secured to the lower end of the lever 129.

The lever 129 is arranged to cooperate with the plate 118 by means of a spherical bearing 138 which is similar to the spherical bearing 106; the outer annular member 140 of the bearing 138 is secured in an aperture 142 formed in the plate 118, while the inner annular member 144 of the bearing 138 is disposed around the lever 129. The arrangement is such that movement of the control knob 130 will bring about corresponding movement on a reduced scale of the plate 118. It should be understood that the degree of reduction afforded by the coarse adjustment lever 129 and the auxiliary slide 14 is considerably less than that afforded by the combination of the levers 40 and 82 and the slides 10 and 12, and that movement of the lever 129 and of the control lever 40 provide independent movements of the workpiece holder 128. The plate 118 is restrained from free movement relative to the plate 30 of the slide 12 by means of the spring-loaded member 126.

The operation of the microscope manipulator is as follows. In order to bring about movement of the workpiece holder 128 in the horizontal plane, the control knob 41 is simply moved in whatever direction it is desired to move the workpiece holder 128. Such movement of the control knob 41 brings about corresponding movement on a reduced scale of the plate 30 of the linear slide 10, and this latter movement is transmitted by the posts 104 and the connecting plate 102 to the upper portion of the lever 82. The movement of the upper portion of the lever 82 in turn brings about corresponding movement on a reduced scale of the plate 30 of the linear slide 12, the workpiece holder 128 moving with this latter plate 30. Thus a doubly reduced movement is executed by the workpiece holder 128 in response to translational movement of the control knob 41. Coarse adjustment of the position of the workpiece holder 128 in a horizontal plane can be effected independently by means of the knob 130.

In order to bring about vertical movement of the workpiece holder 128, the control lever 40 is rotated about its axis by means of the knob 41. As has been explained previously, such rotary movement is transmitted via the universal joints 42 and 66 to the threaded member 64 so as to bring about upward or downward movement of the baseplate 16 depending upon the sense of rotation of the lever 40; it should be appreciated that the provision of the universal joint 42 enables rotation of the lever 40 to be transmitted to the member 64 without disturbing the spatial position of the lever 40.

The microscope manipulator described above has the advantage that smooth and accurate movement of the workpiece holder in three dimensions can be brought about by operation of a single control, namely the control knob 41. Further in view of the fact that a double reduction in motion is achieved by the use of two main linear slides 10 and 12 and two main levers 40 and 82, a very large reduction in motion is obtained with the manipulator. Thus, for example, a reduction in motion of 500 to 1 between the control knob 41 and the workpiece holder 128 can be obtained with the manipulator; it will be appreciated that this amount of reduction enables a workpiece held in the holder 128 to be positioned with extreme accuracy. Moreover, the provision of the connecting plate 102 enables the actual amount of motion reduction obtained with the manipulator to be varied as desired, the amount of reduction depending on the vertical position of the plate 102 relative to the baseplate 16; thus, for example, the amount of reduction can be varied from 500 to 1 down to 100 to 1.

Another advantage of the manipulator described above is that motion is transmitted from the control knob 41 to the workpiece holder 128 without any lost motion or backlash. A still further advantage of the manipulator is that it provides completely natural control of the workpiece holder 128 in the horizontal plane, that is to say horizontal movement of the control knob 41 brings about movement of the workpiece holder 128 in the same direction. It should be understood, however, that in an alternative arrangement to that described above there could be provided reversal of movement in the horizontal plane between the control knob and the workpiece holder; this could be achieved, for example, by arranging the pivot point of one or other of the two main levers to be above that portion of the lever which cooperates with the relevant movable plate.

Yet another advantage of the manipulator is that it includes a coarse adjustment control which enables a workpiece to be positioned approximately in its desired position prior to the accurate positioning using the control knob 41 being performed.

I claim:

1. A micropositioner including at least two linear slides, each linear slide comprising a base member and a movable member which is arranged to be movable, without rotation, substantially in a single plane relative to the base member, and the base members of the linear slides being fixed relative to each other; a control lever which is arranged to be pivotable about a first pivot point substantially fixed relative to the base member of a first one of the linear slides, a first portion of the control lever being arranged to cooperate with the movable member of the first linear slide in such a manner that movement of a second portion of the control lever more remote from said first pivot point than is said first portion of the control lever brings about related movement on a reduced scale of the movable member of the first linear slide; a second lever which is arranged to be pivotable about a second pivot point substantially fixed relative to the base member of a second one of the linear slides, a first portion of said second lever being arranged to cooperate with the movable member of the second linear slide in such a manner that movement of a second portion of said second lever more remote from said second pivot point than is said first portion of said second lever bring about related movement on a reduced scale of the movable member of the second linear slide; and connecting means for connecting said second portion of said second lever to the movable member of the first linear slide for movement therewith.

2. A micropositioner according to claim 1, in which each lever is mounted for universal movement about the relevant pivot point.

3. A micropositioner according to claim 1, in which the position of said connecting means relative to said second pivot point is adjustable so as to enable the overall amount of motion reduction provided by the mechanism to be varied.

4. A micropositioner according to claim 1, in which each lever is arranged to cooperate with the relevant movable member by means of a respective bearing which permits pivotal movement of the lever relative to the relevant movable member.

5. A micropositioner according to claim 1, in which the cooperation of each lever with the relevant movable member is such that translational movement of said second portion of the control lever brings about movement of the movable member of the second linear slide substantially in the same direction.

6. A micropositioner according to claim 1, in which there is provided a coarse adjustment means including: an auxiliary linear slide having a base member which is formed by the movable member of the second linear side, and having a movable member which is movable, without rotation, substantially in a single plane relative to the base member of the auxiliary linear slide; and a further lever which is arranged to be pivotable about a third pivot point substantialy fixed relative to the base member of the auxiliary linear slide, a first portion of said further lever being arranged to cooperate with the movable member of the auxiliary linear slide in such a manner that movement of a second portion of said further lever more remote from said third pivot point than is said first portion of said further lever brings about related movement on a reduced scale of the movable member of the auxiliary linear slide.

7. A micropositioner including: a linear slide mounted on a support, the linear slide comprising a movable member and a base member, the movable member being arranged to be movable, without rotation, substantially in a single plane relative to the base member; and a control lever which is mounted for universal movement about a pivot point substantially fixed relative to the base member of the linear slide, a first portion of the control lever being arranged to cooperate with said movable member in such a manner that movement of a second portion of the control lever more remote from said pivot point than is said first portion brings about related movement on a reduced scale of said movable member, the control lever being rotatable about its axis and being operatively connected with said movable member and said support so that rotation of the control lever brings about movement of the base member of the linear slide relative to said support in a direction perpendicular to said plane.

8. A micropositioner according to claim 7, in which the control lever is arranged to cooperate with said movable member by means of a bearing which permits pivotal movement of the control lever relative to said movable member.

9. A micropositioner according to claim 7, in which the control lever is connected for rotational movement with a first threaded member which is in mating engagement with a second threaded member secured to said support, whereby rotation of the control lever brings about movement of the base member relative to said support in a direction perpendicular to said plane.

10. A micropositioner according to claim 9, in which the connection between the control lever and said first threaded member includes a double universal joint.

11. A micropositioner including: at least two linear slides mounted on a support, each linear slide comprising a base member and a movable member which is arranged to be movable, without rotation, substantially in a single plane relative to the base member, and the base members of the linear slides being fixed relative to each other; a control lever which is arranged to be pivotable about a first pivot point substantially fixed relative to the base member of a first one of the linear slides, a first portion of the control lever being arranged to cooperate with the movable member of the first linear slide in such a manner that movement of a second portion of the control lever more remote from said first pivot point than is said first portion of the control lever brings about related movement on a reduced scale of the movable member of the first linear slide, and the control lever being rotatable about its axis and being operatively connected with the movable member of the first linear slide and with said support so that rotation of the control lever brings about movement of the base member of the first linear slide relative to said support in a direction perpendicular to the plane in which the movable member of the first linear slide is movable relative to the relevant base member; a second lever which is arranged to be pivotable about a second pivot point substantially fixed relative to the base member of a second one of the linear slides, a first portion of said second lever being arranged to cooperate with the movable member of the second linear slide in such a manner that movement of a second portion of said second lever more remote from said second pivot point than is said first portion of said second lever brings about related movement on a reduced scale of the movable member of the second linear slide; and connecting means for connecting said second portion of said second lever to the movable member of the first linear slide for movement therewith.

12. A micropositioner according to claim 11, in which each lever is mounted for universal movement about the relevant pivot point.

13. A micropositioner according to claim 11, in which the position of said connecting means relative to said second pivot point is adjustable so as to enable the overall amount of motion reduction provided by the mechanism to be varied.

14. A micropositioner according to claim 11, in which each lever is arranged to cooperate with the relevant movable member by means of a respective bearing which permits pivotal movement of the lever relative to the relevant movable member.

15. A micropositioner according to claim 11, in which the cooperation of each lever with the relevant movable member is such that translational movement of said second portion of the control lever brings about movement of the movable member of the second linear slide substantially in the same direction.

16. A micropositioner according to claim 11 in which there is provided a coarse adjustment means including: an auxiliary linear slide having a base member which is formed by the movable member of the second linear slide, and having a movable member which is movable, without rotation, substantially in a single plane relative to the base member of the auxiliary linear slide; and a further lever which is arranged to be pivotable about a third pivot point substantially fixed relative to the base member of the auxiliary linear slide, a first portion of said further lever being arranged to cooperate with the movable member of the auxiliary linear slide in such a manner that movement of a second portion of said further lever more remote from said third pivot point than is said first portion of said further lever brings about related movement on a reduced scale of the movable member of the auxiliary linear slide.

References Cited

UNITED STATES PATENTS

| | | | |
|---|---|---|---|
| 2,800,055 | 7/1957 | May | 74—471 |
| 3,046,006 | 7/1962 | Kulicke | 269—60 |
| 3,199,430 | 8/1965 | Brown | 33—174 |
| 3,204,584 | 9/1965 | Mladjan | 74—471 |
| 3,266,523 | 8/1966 | Stevens | 74—471 X |

ROBERT C. RIORDON, *Primary Examiner.*

D. R. MELTON, *Assistant Examiner.*